Patented May 20, 1941

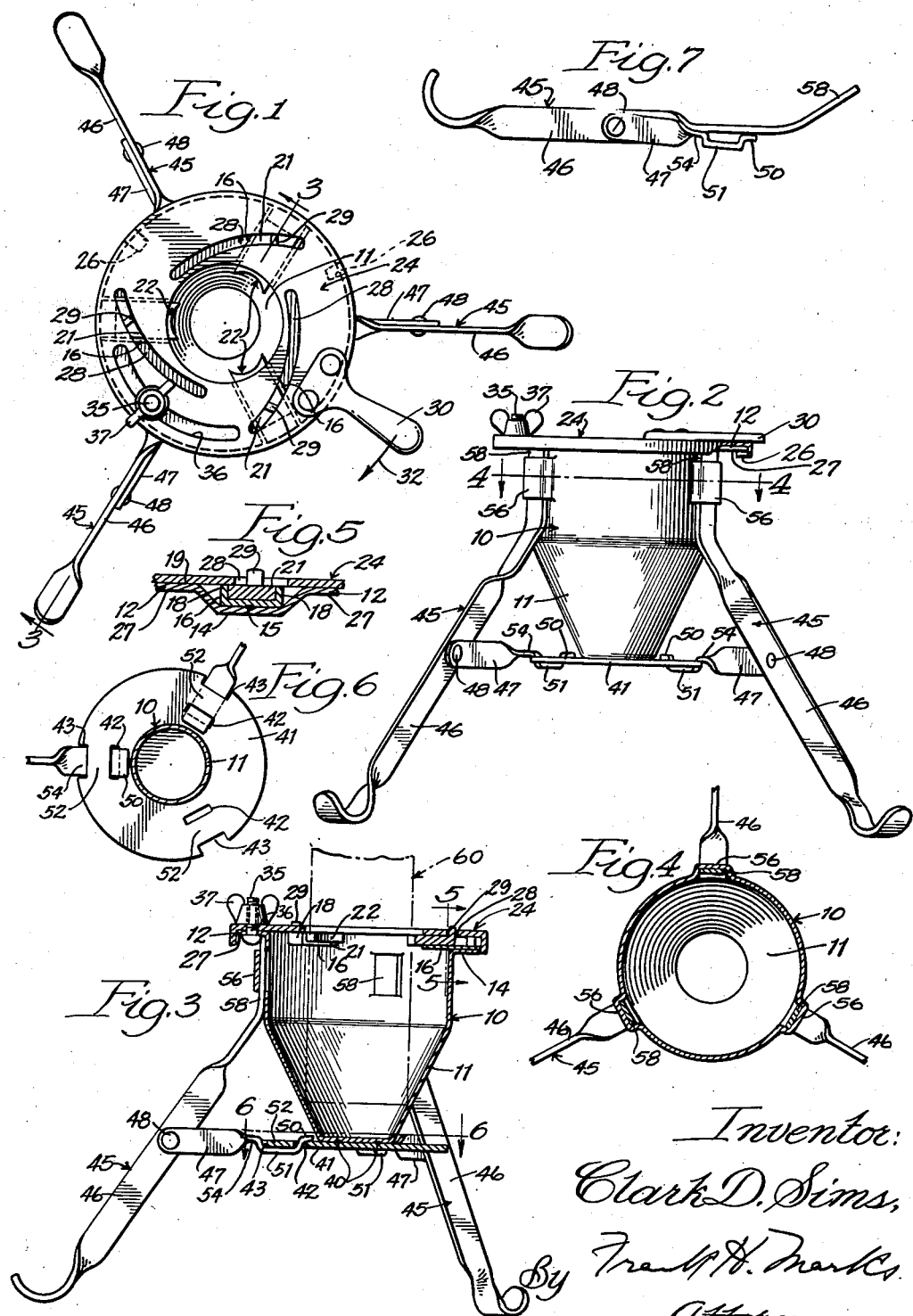

2,242,270

UNITED STATES PATENT OFFICE 2,242,270

SUPPORT

Clark D. Sims, Chicago, Ill., assignor to Sears, Roebuck and Co., Chicago, Ill., a corporation of New York Application August 17, 1938, Serial No. 225,384

7 Claims. (Cl. 248—48)

This invention relates to supports, and is concerned more particularly with stands or holders for Christmas trees and the like.

It is an object of my invention to provide a support of the character referred to adapted to maintain Christmas trees securely in place irrespective of the diameters of the trunks thereof.

It is a further object of the invention to provide a support of the character referred to having a leg spread which is constant for trunks of different diameters.

It is a further object of the invention to provide a support of the character referred to which may be dismantled and packed in a relatively small space.

Another object resides in the provision of a stand of the class referred to constructed in such a manner as to grip the trunk well above the base thereof irrespective of its diameter.

It is also an object of the invention to provide a support of the type referred to which may be locked or unlocked in any adjustment by a single operation.

It is another object to provide a chuck-like structure which may be opened or closed by a single movement.

A further object is to provide a stand for Christmas trees and the like, adapted to fasten the tree in place independently of the legs of the stand.

Further objects and advantages of the invention will appear as the description proceeds.

The invention may be better understood upon reference to the following description and claims and the accompanying drawing, in which:

Fig. 1 is a plan view of a support constructed in accordance with one form of my invention.

Fig. 2 is an elevational view of the same.

Fig. 3 is a sectional view taken as indicated by the line 3—3 in Fig. 1.

Fig. 4 is a plan sectional view taken as indicated by the line 4—4 in Fig. 2.

Fig. 5 is a fragmentary sectional view taken as indicated by the line 5—5 in Fig. 3.

Fig. 6 is a fragmentary sectional plan view taken as indicated by the line 6—6 in Fig. 3.

Fig. 7 shows how parts of the leg construction may be associated to occupy minimum space for storage or shipment.

The invention involves the provision of a cup 10 having a frusto-conical base 11 on which the lower ends of posts, Christmas tree trunks and the like of different diameters may rest, as may be gathered from Fig. 3. The cup 10 may be formed with an outwardly projected flange 12 which, at suitable intervals in the periphery thereof, is formed with preferably radial depressions 14. The number of depressions may be varied as desired and for illustrative purposes only I have included three, preferably equally spaced. In each depression is welded as at 15 or otherwise suitably secured a channel 16 arranged with its flanges 18 extending upward and preferably terminating in or below the plane of the top surface 19 of the main part of the flange 12.

Slidably fitted in each channel 16 is a jaw 21 having a biting grip portion 22 adapted to project in a generally radial direction to engage the surface of the post or trunk to be supported.

Slidably supported over the flange 12 is an annular plate 24 which preferably overlies the channels 16 and has its inner periphery sufficiently large to admit posts, tree trunks and the like within the desired range of diameters. For example, a stand for home use could be constructed in accordance with my invention to accommodate the trunk of the largest tree that the home itself could accommodate.

The plate 24 is provided with lugs 26 which extend under and adjacent to the lower surface 27 of the flange 12 to assist in holding the plate in assembly with the flange. The plate has a cam slot 28 for each jaw 21, and the jaw has a lug 29 slidably fitted in said slot, as shown in Figs. 1, 3 and 5. A handle 30 is secured to the plate 24 at any suitable point, and it is apparent that when the plate 24 is turned in the direction indicated by arrow 32 in Fig. 1 the walls of the cam slots 28 will force the jaws inward like a chuck to grab and securely hold the post, tree trunk or other element to be supported. It will be observed that the cam slots are of rather light slope so that the jaws are urged inward with great force, and yet are of sufficient slope to insure the movement of the jaws throughout the desired distance, to accommodate different diameters. It will be noted further that with the single pull of the handle 30 the jaws may be moved the full distance inward or outward as the case may be.

In order to lock the jaws in any desired position, I have provided the cup flange 12 with a screw 35 which may be secured thereto, if desired, and which extends upward through the flange and through a concentric arcuate slot 36 in the plate 24, and receives a suitable nut such as a wing nut 37. It is apparent that by tightening the nut 37 the plate 24 cannot move and accordingly the jaws are locked. It will be noted further that the bolt and nut cooperate with the lugs 26 in holding the plate 24 in proper sliding relation to the flange 12.

For the purpose of attaching supporting legs to the cup, I secure at the base thereof, by welding 40 or otherwise, a plate 41 having preferably radially aligned sets of closed and open slots 42 and 43, respectively. The number of such sets may be varied as desired as may also the number of legs cooperating therewith, as will appear. In accordance with the illustrated form of the invention each leg structure 45 may be independent of the others, and comprises a floor-engaging member or foot 46 and a brace member 47 pivotally connected to the member 46 as at 48. The brace member 47 may have a generally V-shaped inner portion so configured as to provide a hook 50 adapted to be inserted upward through a slot 42, a bight 51 adapted, when the member 47 is in operative position, to engage the under side of the plate portion 52 between the set of slots 42 and 43, and another part 54 adapted to extend through the slot 43.

The upper portion of the cup 10 is provided with outside sockets which may be formed in any suitable manner, as by stamping portions 56 outward from the body of the cup material. These sockets are of a size to slidably receive the upper ends 58 of the feet 46, and said ends 58 may be slid upward into and through said sockets while the brace members 47 are being swung upward after the insertion of the hooks 50 thereof through the slots 42. When the braces 47 are substantially engaged with the plate portions 52 the tops of the foot portions 58 are substantially engaged with the lower surface 27 of the flange 12.

The jaws as they appear in the drawing are adjusted at points intermediate their limits of movement for gripping the surface of the trunk or post 60 (Fig. 3). It will be observed that the slope of the frusto-conical portion 11 of the cup is such that even when the largest diameter of post adapted to be received by the cup is disposed therein, there is a substantial length of the post between the place of its engagement with the cup portion 11 and the place where it is gripped by the jaws 21, thereby insuring against the post's becoming loose or swaying in the cup.

The leg structure may be disassembled from the cup structure by substantially a single movement in each case involving practically the reverse of the assembly operation. The braces are so formed relative to the feet that, for the purpose of shipment or storage, each brace may be swung alongside the associated foot and occupy a minimum of space as shown in Fig. 7.

The various parts may be made of any metal or any other suitable material. Sheet metal may be used wherever desired.

The cup 10 may contain water for irrigating the lower ends of Christmas trees supported by the holder.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A Christmas tree holder comprising cup means having a conical base, outer sockets formed on said cup means above said base, said cup means having an abutment above the lower end of each socket, foot members extending into said sockets and engaging the abutment, brace means connected to each foot member, one of said means having a slot and the other of said means projecting through said slot and engaged with upper and lower portions of said one means so as to limit upward movement of the outer end of said brace means, whereby said foot and brace means may be assembled with and disassembled from said cup with substantially a single movement in each case.

2. A Christmas tree holder comprising a cup having a downwardly converging base, outer sockets formed on the said cup above said base, said cup having an outwardly extending flange above said sockets, said cup having a base plate with sets of substantially radially aligned slots, the outer slot of each set being open, a foot extending through each socket and abutting said flange, a brace pivotally connected to said foot and having an inner substantially U-shaped portion, the arms of which are extended through the slots of a set, the inner arm resting on said plate and the bight engaging the under side of said plate, whereby said foot and brace may be assembled with and disassembled from said cup with substantially a single movement in each case, said flange having substantially radially depressed portions, jaws slidably received in said depressed portions, an annular plate rotatably mounted on said flange and overlying said jaws, said plate having cam slots, said jaws having lugs in said slots, means on said plate and in substantially sliding engagement with the under side of said flange, said plate having a concentric slot, a bolt projecting upward from said flange through said slot, a nut threaded on said bolt and adapted to be clamped against the top of said plate to releasably secure said jaws in the desired position of adjustment, and a handle secured to said plate for convenient manipulation thereof.

3. A Christmas tree holder comprising a cup having a flange having substantially radially depressed portions, jaws slidably received in said depressed portions, an annular plate rotatably mounted on said flange and overlying said jaws, said plate having cam slots, said jaws having lugs in said slots, means on said plate and in substantially sliding engagement with the under side of said flange for anchoring said plate to said cup, said plate having a concentric slot, a bolt projecting upward from said flange through said concentric slot, a nut threaded on said bolt and adapted to be clamped against the top of said plate to releasably secure said jaws in the desired position of adjustment, and a handle secured to said plate for convenient manipulation thereof.

4. A Christmas tree holder comprising a cup having outer sockets and an abutment associated with each socket, a foot member extending upward in each socket and abutting said abutment, a brace member pivotally connected to said foot member and having an inner portion connected with said cup in a manner limiting the extent to which the outer portion of said brace member may be raised, whereby said foot member may be inserted in and removed from a socket with substantially a single movement in each case, the adjacent portions of said foot and brace members being formed to nest together when the foot is dismantled from the cup, to occupy minimum space for storage or shipment.

5. A Christmas tree holder comprising a cup member, movable jaws carried by said cup member, an annular member rotatably mounted on said cup member and disposed adjacent said jaws, said annular member having cam slots, said jaws having lugs in said slots, readily accessible means carried by one of said members and engageable with the other member to releasably prevent rotation of said member and thereby secure said jaws in the desired adjustment, and a handle carried by said annular member for convenient manipulation thereof.

6. A Christmas tree or the like holder comprising a member having a supporting portion upon which the lower ends of trees of different diameters may rest, an upper portion, jaws movably carried by said upper portion and adapted to grip a tree well above the lower end thereof, rotatable means mounted on said holder, connecting means including interfitting portions on said rotatable means and on said jaws, so that a movement of said rotatable means in either direction will move said jaws inwardly or outwardly, said connecting means being so proportioned that a movement of said rotatable means over a relatively limited arc will substantially completely converge or diverge said jaws, and means for locking said jaws in adjusted position.

7. A Christmas tree or the like holder comprising a member having a supporting portion upon which the lower end of trees of different diameters may rest, an upper portion, jaws movably carried by said upper portion and adapted to grip a tree well above the lower end thereof, rotatable means for moving said jaws simultaneously, including a plurality of cams on said rotatable means, each of said cams being adapted to cooperate with a portion on each jaw, said cams being so sloped and said portions on said jaws being so positioned that a movement of said rotatable means over a relatively limited arc will substantially completely converge or diverge said jaws, and means for locking said jaws in adjusted position.

CLARK D. SIMS.